W. S. TODD.
Corn Planter.
No. 37,834.
Patented Mar. 3, 1863.
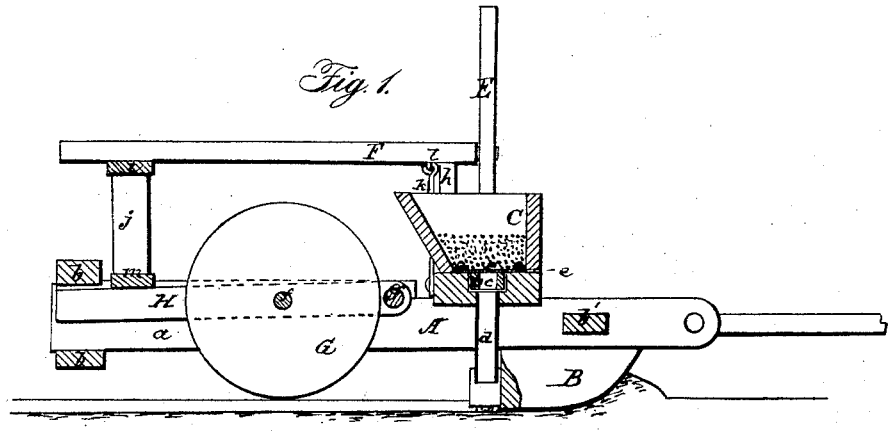
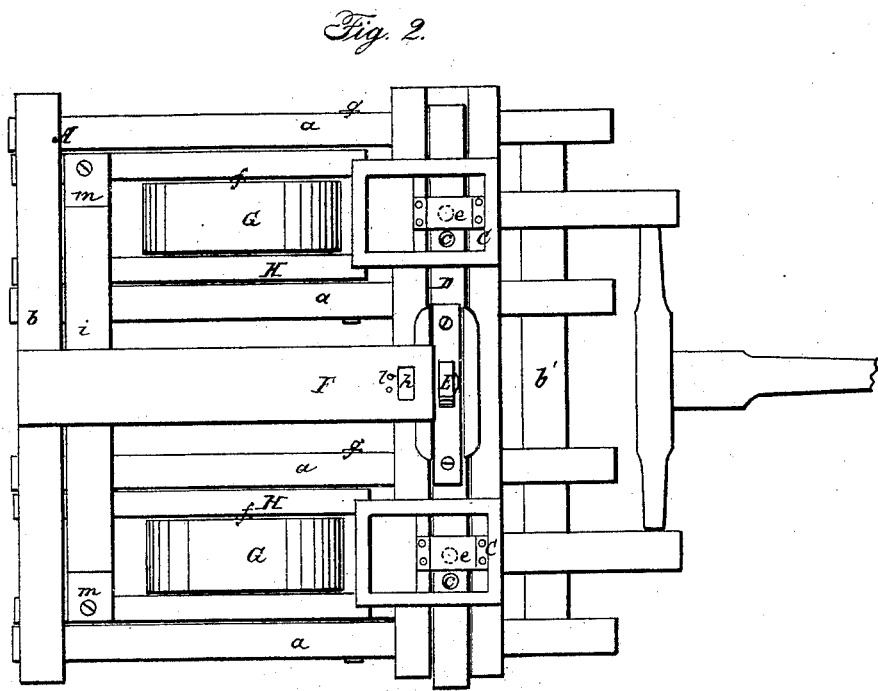
Witnesses:
Inventor:

UNITED STATES PATENT OFFICE.

WILLIAM S. TODD, OF MECHANICSVILLE, IOWA.

IMPROVEMENT IN CORN-PLANTERS.

Specification forming part of Letters Patent No. 37,834, dated March 3, 1863.

*To all whom it may concern:*

Be it known that I, WILLIAM S. TODD, of Mechanicsville, in the county of Cedar and State of Iowa, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of my invention. Fig. 2 is a plan or top view of the same.

Similar letters of reference in both views indicate corresponding parts.

This invention relates to a certain improvement in the running-gear of corn-planters; and the invention consists in the arrangement of two secondary hinged frames, which form the bearings for the axles of the covering-wheels of a corn-planter, and which support the rear end of the driver's seat, in combination with the main frame, the front part of which rests on the runners or furrow-openers, and which supports the front end of the driver's seat in such a manner that the covering-wheels can adapt themselves to the inequalities of the ground, one independent of the other, and at the same time the driver is enabled to divide his weight equally between said wheels and the furrow-openers or runners, or to shift it toward one or the other, at pleasure.

To enable those skilled in the art to make and use my invention, I will proceed to describe it with reference to the drawings.

A represents the main frame, which is constructed of four longitudinal timbers, $a$, which are connected in front and rear by transverse timbers $b$ $b'$. The front end of this frame rests on two runners or furrow-openers, B, and it supports two hoppers, C, from which the seed is discharged by means of a reciprocating slide, D, or by any other convenient device.

The front edges of the runners are shod with steel, so that the same produce a clean, smooth furrow; and the seed-dropping device is operated by a hand-lever, E, which is pivoted to the front edge of the driver's seat F. By imparting to this hand-lever an oscillating motion the seed-dropping devices in both hoppers are operated simultaneously, and for each stroke the requisite quantity of seed is discharged through the seed-cell $c$ and tubes $d$, the surplus seed being scraped off by abutments $e$, of india-rubber, that are secured in the interior of the hoppers.

The seed on passing down through the tube $d$ is deposited in the furrows opened by the runners B, and it is covered by the action of the wheels G, which support the rear end of the main frame A and its attachments. These wheels run on axles $f$, which have their bearings in the longitudinal timbers of secondary frames H, that are hinged to the longitudinal timbers $a$ of the main frame by means of pivots $g$, so that either of them, together with its wheel, can rise and fall independent of the other. The rear ends of the secondary hinged frames are confined between the transverse timbers $b$ of the main frame, leaving them free, however, to rise and fall sufficiently far to permit the wheels G to adjust themselves to the inequalities of the ground.

The driver's seat F is supported at its front end by a standard, $h$, rising from the platform which supports the hoppers, or from some portion of the main frame A, and at its rear end by a cross-bar, $i$, which is secured to the upper ends of two standards, $j$, rising from the rear ends of the hinged frames H. The upper end of the standard $h$ is inserted loosely into a mortise near the front end of the driver's seat, and a hook, K, which catches into a staple, $l$, projecting from the under side of said seat, prevents the same coming off spontaneously from the standard $h$. The standards $j$ are provided with tenons at their lower ends, which are inserted loosely into mortises in the rear cross-bar, $m$, of the hinged secondary frames H. By these means the driver's seat is perfectly free to accommodate itself to the variable position of the secondary frames, which rise and fall as the wheels pass over uneven ground, and at the same time, by having the front end of the driver's seat resting on the main frame and its rear end on the secondary frames, the driver is enabled to divide his weight equally on the covering-wheels and on the runners, or to bear down more or less on either end of the machine, at pleasure.

By the application of the secondary frames the frame-work of my planter is made yielding, and at the same time all its parts are firm and durable.

Having thus fully described my invention, what I claim as new, and desire to secure by Letters Patent, is—

The arrangement of the secondary hinged frames H, forming the bearings for the axles of the wheels G, in combination with the main frame A and driver's seat F, all constructed and operating substantially as and for the purposes shown and described.

WILLIAM S. TODD.

Witnesses:
WILIAM WILSON,
GEORGE KALB.